United States Patent [19]
Wilf et al.

[11] Patent Number: 5,899,980
[45] Date of Patent: May 4, 1999

[54] RETAIL METHOD OVER A WIDE AREA NETWORK

[75] Inventors: Saar Wilf; Guy Ruvio, both of Jerusalem, Israel

[73] Assignee: Trivnet Ltd., Herzlia, Israel

[21] Appl. No.: 08/908,067

[22] Filed: Aug. 11, 1997

[51] Int. Cl.$^6$ .................................................. G06F 17/60
[52] U.S. Cl. ................................ 705/26; 705/26; 705/27
[58] Field of Search .................................. 705/26, 27, 44, 705/40; 380/24, 25, 4

[56] References Cited

U.S. PATENT DOCUMENTS

| | | | |
|---|---|---|---|
| 4,578,530 | 3/1986 | Zeidler | 178/22.09 |
| 4,799,156 | 1/1989 | Shavit et al. | 705/26 |
| 4,947,028 | 8/1990 | Gorog | 235/380 |
| 4,992,940 | 2/1991 | Dworkin | 705/26 |
| 5,446,489 | 8/1995 | Egendorf | 348/3 |
| 5,671,279 | 9/1997 | Egamal | 380/23 |
| 5,699,528 | 12/1997 | Hogan | 705/40 |
| 5,710,887 | 1/1998 | Chelliah et al. | 395/226 |
| 5,715,314 | 2/1998 | Payne et al. | 380/24 |
| 5,717,917 | 2/1998 | Rose et al. | 380/25 |
| 5,724,424 | 3/1998 | Gifford | 380/24 |
| 5,727,163 | 3/1998 | Bezos | 705/27 |
| 5,745,556 | 4/1998 | Ronen et al. | 379/127 |
| 5,745,884 | 4/1998 | Carnegie et al. | 705/34 |
| 5,754,655 | 5/1998 | Hughes et al. | 705/34 |
| 5,794,221 | 8/1998 | Egendorf | 379/114 |
| 5,809,144 | 9/1998 | Sirbue et al. | 380/24 |
| 5,822,737 | 10/1998 | Ogram | 705/26 |
| 5,825,881 | 10/1998 | Colvin, Sr. | 380/24 |

FOREIGN PATENT DOCUMENTS

| | | |
|---|---|---|
| 623904A1 | 9/1994 | Japan . |
| WO 97/03410 | 1/1997 | WIPO . |
| WO 97/40615 | 10/1997 | WIPO . |

OTHER PUBLICATIONS

Sirbu et al; NetBill: An Internet Commerce System Optimized for Network Delivered Services; Carnegie Mellon University, Oct. 1994.

Sibert et al; The Dialogue Box: A Self–Protecting container for information Commerce: Electronic Publishing Resources, Inc, Jul. 1995.

*Primary Examiner*—Allen R. MacDonald
*Assistant Examiner*—Romain Jeanty
*Attorney, Agent, or Firm*—Kenyon & Kenyon

[57] ABSTRACT

A retail method over a wide area network. The wide area network includes a point of sale computer station, a network service provider server operated by a network service provider, a customer computer station used by a customer and connected to the wide area network through the network service provider server, and a transaction server having access to identification information of the network service provider and the point of sale computer station. The method includes the steps of connecting the customer computer station to the point of sale computer station, purchasing goods from the point of sale computer station by the customer, validation of the purchasing by the transaction server and the network service provider server, charging the customer for the purchase. The step of charging includes a transaction including the steps of billing an account of the customer by the network service provider server a transaction sum and billing by the transaction server an account of the network service provider server the transaction sum. The retail method also includes supplying the goods to the customer and remitting a portion of the transaction sum to a vendor operating the point of sale computer station.

24 Claims, 5 Drawing Sheets

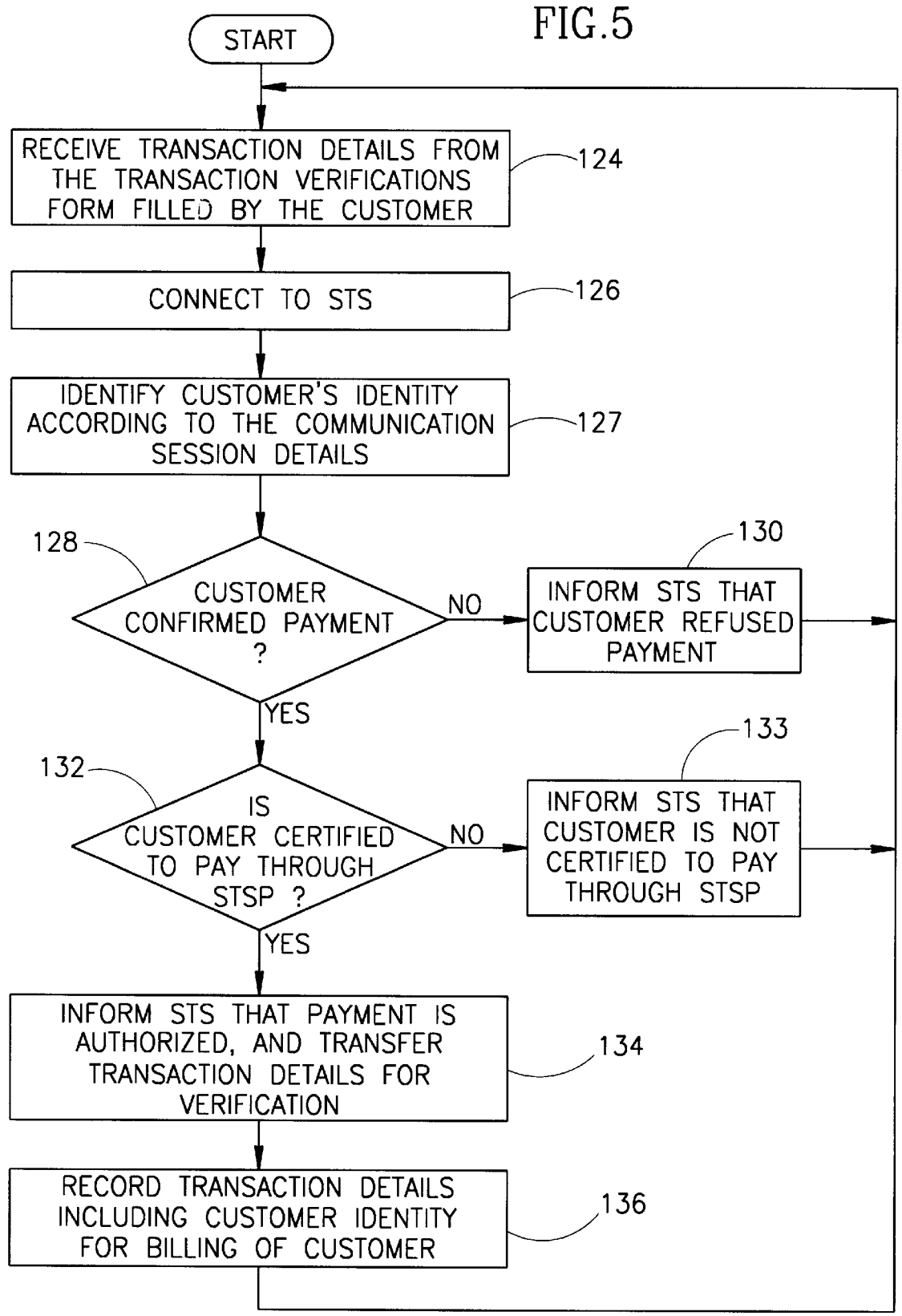

5,899,980

RETAIL METHOD OVER A WIDE AREA NETWORK

FIELD OF THE INVENTION

The present invention relates generally to a retail method for performing commercial transactions over a wide area network and more particularly to a retail method for performing commercial transactions over the Internet.

BACKGROUND OF THE INVENTION

The Internet is a worldwide network of interconnected computers and computer networks. The Internet includes Internet service providers (ISPs) who provide Internet access to a large number of subscribers or users who pay the ISP a fee for the access. The subscribers can be individuals or organizations and can access the Internet by connecting to the ISP using modems over the general switched telephony system (GSTN), or cable television networks, or other types of communication line infrastructure. The Internet also includes vendors who advertise products and services over the Internet and solicit orders from users. Commercial transactions over the Internet can be performed in a variety of ways. A preferred way of payment is by credit card. However, because of security reasons there is great reluctance of the users to transmit credit card account information over the Internet. Additionally, in situations were the transaction amount is small, for example, a few dollars or less, it may not be practical for a vendor to use a credit card transaction. PCT international publication No. WO 97/03410 to Egendorf discloses a method for Internet billing. According to which an ISP can bill a billing acount of a customer for products or services purchased from a vendor over the Internet, avoiding the need to communicate the customer's credit card or account number over the Internet. However, the method is limited in that each ISP has to establish agreements with a multiplicity of vendors some of which may not be subscribers of the ISP. Furthermore, each vendor has to establish separate agreements with a multiplicity of ISPs to be able to use the method of WO 97/03410 for performing transactions with customers of different ISPs.

SUMMARY OF THE INVENTION

It is noted that, while the retail method of the present invention is adapted for use over the Internet, other preferred embodiments can be implemented in which the retail method is adapted for use over any wide area network using any suitable communication protocol which are within the scope and spirit of the present invention.

It is therefore an object of the present invention to provide a retail method which provides vendors and customers a secure and economical way of selling and purchasing goods over a wide area network.

An aspect of the retail method of the present invention is that the customer does not need to transmit sensitive information such as a credit card number over the Internet for purchasing goods or services, neither does the user need to install additional software on his computer for using the billing method of the present invention.

There is therefore provided, in accordance with a preferred embodiment of the present invention, a retail method over a wide area network. The network includes a point of sale computer station, a network service provider server operated by a network service provider, a customer computer station used by a customer and connected to the wide area network through the network service provider server, and a transaction server having access to identification information of the network service provider and the point of sale computer station. The method includes the steps of connecting the customer computer station to the point of sale computer station, purchasing goods from the point of sale computer station by the customer, validating the purchasing by the transaction server and the network service provider server, charging the customer for the purchasing, the charging including a transaction including the steps of billing an account of the customer by the network service provider server a transaction sum, and billing by the transaction server an account of the network service provider server the transaction sum, supplying the goods to the customer, and remitting a portion of the transaction sum to a vendor operating the point of sale computer station.

Further, in accordance with another preferred embodiment of the present invention, the retail method further includes the step of remitting a portion of the transaction sum to a network service provider operating the network service provider server.

Further still, in accordance with yet another preferred embodiment of the present invention, the retail method also including the step of remitting a portion of the transaction sum to the transaction service provider operating the transaction server.

Furthermore, in accordance with another preferred embodiment of the present invention, the step of validating includes the steps of automatically receiving by the transaction server from the customer computer station of the transaction details and identification information for identifying the point of sale computer station and the network address of the customer computer station, sending a transaction verification form from the transaction server to the customer computer station, the transaction verification form includes at least the transaction details and information for contacting the network service provider server, entering by the customer in the transaction verification form a confirmation or a denial of the transaction details, sending by the customer computer station of the transaction details and the confirmation or the denial of the transaction details from the customer computer station to the network service provider server using the information for contacting the network service provider server included in the transaction verification form, informing the transaction server by the network service provider server of the confirmation or the denial of the transaction details by the customer in the transaction verification form, and instructing the point of sale computer station by the transaction server to supply or deny the goods to the customer in accordance with the confirmation or the denial, respectively, of the transaction details by the customer.

Furthermore, in accordance with yet another preferred embodiment of the present invention, the step of validating includes the steps of automatically receiving by the transaction server from the customer computer station of transaction details of the transaction and identification information for identifying the point of sale computer station and the network address of the customer computer station, sending the transaction details and the network address of the customer computer station from the transaction server to the network service provider server, the transaction server causing the customer computer station to contact the network service provider, sending a transaction verification form from the network service provider server to the customer computer station, the transaction verification form including at least the transaction details, entering by the customer in the transaction verification form a confirmation or a denial of the transaction details, sending by the customer computer station of the transaction verification form including the confirmation or the denial of the transaction details from the customer computer station to the network service provider server, informing the transaction server by the network service provider server of the confirmation or the denial of the transaction details by the customer in the transaction verification form, and instructing the point of sale computer station by the transaction server to supply or deny the goods to the customer in accordance with the confirmation or the denial, respectively, of the transaction details by the customer.

There is also provided, in accordance with a preferred embodiment of the present invention a system for using a retail method over a wide area network. The system includes at least one network service provider server operated by a network service provider and connected to the wide area network. The system also includes at least one customer computer station used by a customer and connected to the wide area network through one of the network service provider servers. The system also includes at least one point of sale computer station connected to the wide area network and at least one transaction server having access to identification information of the at least one network service provider and the at least one point of sale computer station and connected to the wide area network. The retail method includes the steps of connecting one of the customer computer stations to one of the points of sale computer station, purchasing goods from the point of sale computer station by the customer operating the customer computer station, validating the purchasing by one transaction servers and one of the network service provider servers, charging the customer for the purchasing, the charging including a transaction including the steps of billing an account of the customer by the network service provider server a transaction sum and billing by the transaction server an account of the network service provider server the transaction sum, supplying the goods to the customer, and remitting a portion of the transaction sum to a vendor operating the point of sale computer station.

Furthermore, in accordance with another preferred embodiment of the system of present invention, the step of validating includes the steps of automatically receiving by the transaction server from the customer computer station of transaction details of the transaction and identification information for identifying the point of sale computer station and the network address of the customer computer station, sending a transaction verification form from the transaction server to the customer computer station, the transaction verification form including at least the transaction details and information for contacting the network service provider server, entering by the customer in the transaction verification form a confirmation or a denial of the transaction details, sending by the customer computer station of the transaction details and the confirmation or the denial of the transaction details from the customer computer station to the network service provider server using the information for contacting the network service provider server included in the transaction verification form, informing the transaction server by the network service provider server of the confirmation or the denial of the transaction details by the customer in the transaction verification form, and instructing the point of sale computer station by the transaction server to supply or deny the goods to the customer in accordance with the confirmation or the denial, respectively, of the transaction details by the customer.

Furthermore, in accordance with another preferred embodiment of the system of the present invention, the step of validating includes the steps of automatically receiving by the transaction server from the customer computer station of transaction details of the transaction and identification information for identifying the point of sale computer station and the network address of the customer computer station, sending the transaction details and the network address of the customer computer station from the transaction server to the network service provider server, the transaction server causing the customer computer station to contact the network service provider, sending a transaction verification form from the network service provider server to the customer computer station, the transaction verification form including at least the transaction details, entering by the customer in the transaction verification form a confirmation or a denial of the transaction details, sending by customer computer station of the transaction details and the confirmation or the denial of the transaction details from the customer computer station to the network service provider server, informing the transaction server by the network service provider server of the confirmation or the denial of the transaction details by the customer in the transaction verification form, and instructing the point of sale computer station by the transaction server to supply or deny the goods to the customer in accordance with the confirmation or the denial, respectively, of the transaction details by the customer.

Further, in accordance with another preferred embodiment of the present invention, the identification information of the network service provider and the point of sale computer station includes information for associating a customer network address with a network service provider and technical information needed to contact the network service provider server, and information for associating the vendor with the technical information needed to contact the point of sale computer station over the wide area network.

Furthermore, in accordance with another preferred embodiment of the present invention, the information for associating a customer and the information for associating the vendor are stored on the transaction server or accessible to the transaction server.

Furthermore, in accordance with another preferred embodiment of the present invention, the wide area network is the Internet, the network service provider is an Internet service provider, the information for associating a customer includes at least the Internet protocol (IP) address space of the Internet service provider and the technical information needed to contact the Internet service provider, and the information for associating the vendor is technical information needed to contact the point of sale computer station over the Internet.

Furthermore, in accordance with another preferred embodiment of the present invention, the step of charging further includes the step of recording by the network service provider server of the transaction details for billing the customer by the network service provider.

Furthermore, in accordance with another preferred embodiment of the present invention, the step of remitting includes the step of crediting an account of the vendor by the portion of the transaction sum.

Furthermore, in accordance with another preferred embodiment of the present invention, the step of crediting is performed by a financial service provider.

Furthermore, in accordance with another preferred embodiment of the present invention, the financial service provider is selected from the group consisting of a bank and a credit card company.

Further yet, in accordance with another preferred embodiment of the present invention, the account of the vendor is a bank account or a credit card account.

Further still, in accordance with yet another preferred embodiment of the present invention, the communication between the point of sale computer station and the transaction server and between the transaction server and the network service provider server is encrypted.

Furthermore, in accordance with another preferred embodiment of the present invention, the transaction service provider operating the transaction server establishes a remitting agreement with the vendor for remitting a portion of the transaction sum to the vendor after the step of charging. The remitting agreement is established prior to using the retail method and the transaction service provider establishes a billing agreement with the network service provider for billing an account of network service provider the transaction sum for goods purchased by the customer from the point of sale computer station. The billing agreement is established prior to using the retail method.

Furthermore, in accordance with another preferred embodiment of the present invention, the network service provider establishes a billing agreement with the customer for billing an account of the customer the transaction sum for goods purchased by the customer from the point of sale computer station. The billing agreement is established prior to using the retail method.

Finally, in accordance with another preferred embodiment of the present invention, a per transaction billing agreement is established between the customer and the network service provider for billing an account of the customer the transaction sum for goods purchased by the customer from the point of sale computer station.

BRIEF DESCRIPTION OF THE DRAWINGS

The invention is herein described, by way of example only, with reference to the accompanying drawings, wherein:

FIG. 5 is a schematic flow chart illustrating the steps of the retail method performed by an Internet service provider (ISP) server of the system of FIG. 1.

DETAILED DESCRIPTION OF THE INVENTION

Figure 1:
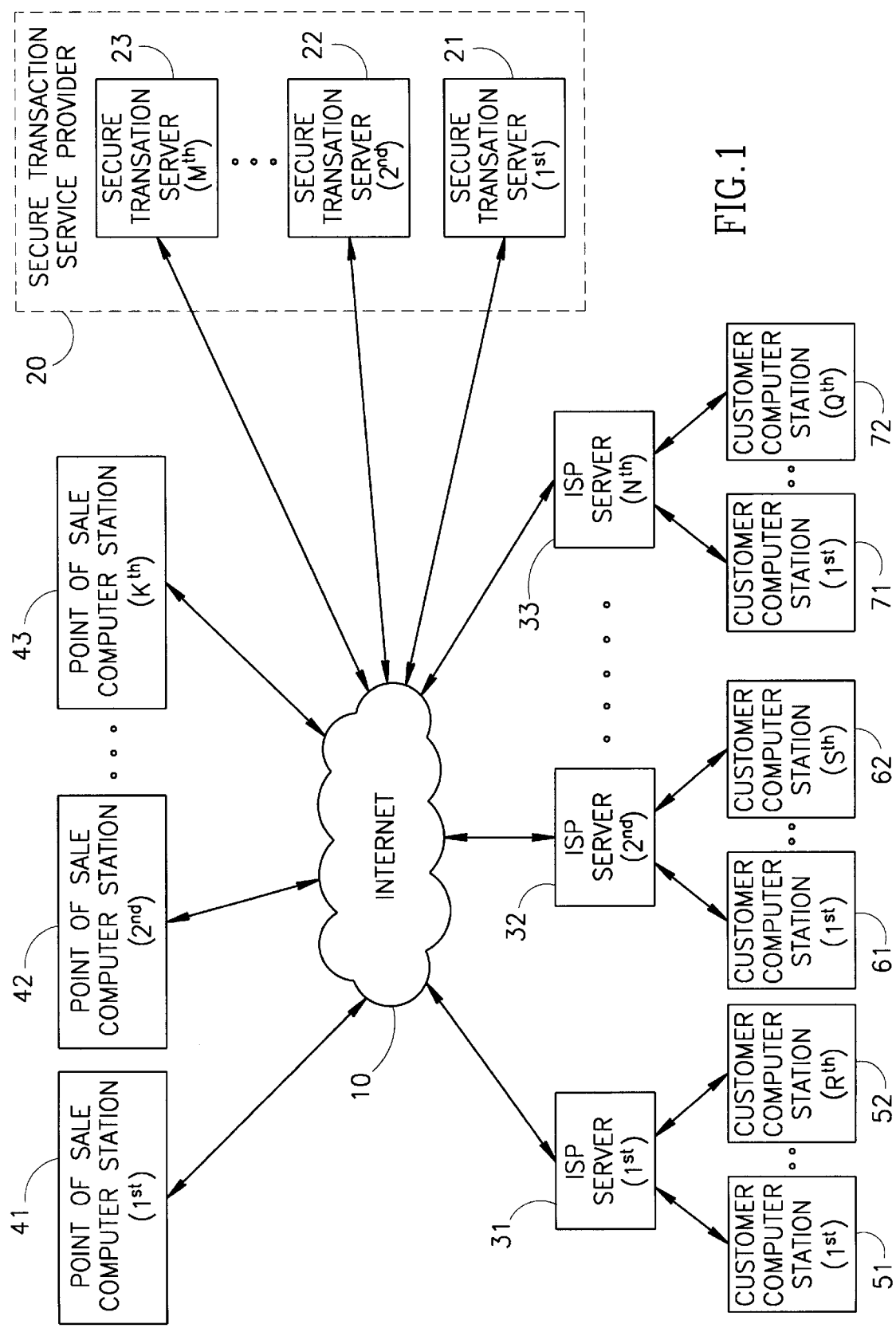
FIG. 1 is a schematic block diagram of a system for carrying out the retail method over the Internet, in accordance with a preferred embodiment of the present invention.

Reference is now made to FIG. 1 which is a schematic block diagram of a system for carrying out the retail method, in accordance with a preferred embodiment of the present invention. The system includes a secure transaction service provider 20 (STSP) which includes a plurality of M secure transaction servers (STS) labeled 21, 22 connected to the Internet 10. The system also includes a plurality of N ISP servers labeled 31–33 connected to the Internet 10, and a plurality of K point of sale computer stations labeled 41–43, connected to the Internet 10. Each of the plurality of N ISP servers provides Internet access to a plurality of customer computer stations. For example, ISP server 31 provides Internet access to a plurality of R customer computer stations labeled 51–52, ISP server 32 provides Internet access to a plurality of S customer computer stations labeled 61–62 and ISP server 33 provides Internet access to a plurality of N customer computer stations labeled 71–72. Wherein each of the numbers K, M, N, Q, R and S may be any non-zero positive integer.

Preferably, each of the M STSs 21–23 is directly connected to the Internet backbone (not shown) for fast access. However, some or all of the STSs can be connected to the Internet 10 by any other suitable connection method.

Each of the K point of sale computer stations labeled 41–43 can be a server operated by a vendor and connected to the Internet directly, a point of sale residing on a server and operated for a vendor by an Internet presence provider (IPP) or any point of sale computer station connected to the Internet by any other suitable connection method.

It is noted that, the STSP 20 may also operate as an IPP. Thus, any one of the K points of sale may not be independent computer stations but may physically reside on one of the STSs 21–23. In such a case, the software for the vendor's site will be installed on one or more of the STSs 21–23.

It is further noted that, each ISP may operate more than one server (not shown).

Each of the customer computer stations 51–52, 61–62 and 71–72 can be connected to the ISP servers 31, 32 and 33, respectively, through a modem and the GSTN or a cable modem and a cable television network, or by any other suitable communication method.

It is noted that, although the system of FIG. 1 is shown as including a plurality of STSs 21–23, the system can also operate with a single STS.

It is noted that the STSs 21–23 of the STSP 20 can be located in the same geographical location but can also be located singly or in groups at separate geographical locations.

The secure transaction service provider 20 is a service provider operating one or more STSs connected to the Internet. The STSP 20 provides software modules which are installed on point of sale computer stations, on the ISP servers and on each of the STSs. It is noted that, if the ISP has more than one server, the software modules may be installed on each of the ISP servers or only on part of them. Each of the ISPs notifies the STSP 20 of the IP address space which the ISP allocates to its customers for connecting to the Internet, as allocated to the ISP by the proper authorities such as the INTERNIC. Each of the ISPs may also provide the STSP with other technical information which may be needed such as the IP addresses of the ISP's hypertext transfer protocol (HTTP) proxy servers and the bandwidth of the ISP's connection to the Internet.

The software module installed on the ISP servers can identify a customer currently using a given IP address. This software module also manages the billing of the customers in accordance with the purchase of goods from various vendors, manages the communication with the STS and the customer computer stations and checks whether the customer is certified to pay through the STSP as disclosed in detail hereinafter.

The software module installed on the point of sale computer stations manages the registration of the sales and transactions done through the STSP involving the vendor.

This software module also manages the pricing of goods offered by the vendor through the STSP.

The software module on the point of sale computer stations also manages the communication with the STS, as disclosed in detail hereinafter.

The software module installed on the STSs includes a database or a table including identification information associating the IP address spaces obtained from the ISPs as disclosed hereinabove with the information needed to communicate with the ISPs owning these address spaces.

The software module installed on the STSs can thus identify the ISP of a customer having an IP address by accessing the database or table disclosed hereinabove. The software module installed on the STSs also manages the financial information needed for implementing the billing such as the credit card account numbers of the ISPs and vendors, and the details of purchases. The software module installed on the STSs also manages all the communication with the point of sale computer stations, customer computer stations and ISP servers, as disclosed in detail hereinafter.

Each of the point of sale computer stations 41–43 is assigned an ID number and the STSs have access to a look up table (LUT) which associates each point of sale computer station's ID number with the technical information needed to contact the point of sale computer station.

The STSP, the customers, the vendors and the ISPs receive financial services from one or more financial service providers such as a credit card company or a bank or any other suitable financial service company. The STSP, the customers, the vendors and the ISPs have bank accounts or credit card accounts with the financial service providers and can provide a bank account number or a credit card number for performing financial transactions.

In accordance with a preferred embodiment of the present invention, when any one of the customer computer stations 51–52, 61–62 and 71–72 connects to the wide area network 10 through the ISP servers 31, 32 and 33, respectively, the customer computer station can connect with any one of the point of sale computer stations labeled 41–43. The customer can request goods such as a service or a product which are offered for sale by the vendor and pays the vendor for the goods. For example, after entering the vendor's site, the customer may request goods by choosing a specific option on a web page.

If the vendor allows payment for the requested service or product through the STSP method, and the customer elects to use the STSP payment method option on the web page, the point of sale computer station causes the customer computer station to connect to one of the available STSs 21–23 and to transfer the ID of the point of sale computer station and the transaction details to the available STS. This can be done, for example, by using an hypertext markup language (HTML) tag such as an "href" tag. The transaction details include the price and serial number of the requested product or service and additional details such as the payment date or other payment terms.

After the customer computer station contacts the available STS, the STS sends the customer computer station a transaction verification form. The transaction verification form is generated by HTML or Java or by any other suitable method.

The transaction verification form informs the customer about the requested product or service, the price and the payment terms for the transaction. The transaction verification form also includes information which is not shown to the customer including the address of the ISP server. which provides service to the customer. This information is obtained from the database or the table accessible to the STSs as disclosed hereinabove, by using the automatically revealed IP address of the customer computer station and may be formatted in the transaction verification form as a uniform resource locator (URL) in an HTML link.

It is noted that, If the communication is performed over a wide area network having a communication protocol other than the exemplary TCP/IP protocol of the Internet, other data, appropriate for the communication protocol which is used over the wide area network will be used to identify the customer's ISP.

The customer can either confirm or deny the transaction after inspecting the transaction details on the transaction verification form. If the customer confirms the transaction, the customer thus connects to the ISP server using the data sent from the STSs in the transaction verification form, and the relevant data in the transaction verification form is then sent to the ISP server. The software module of the ISP server identifies the customer according to the IP address or other information such as a physical communication port ID and checks whether the customer is certified to pay through the STSP.

It is noted that the verification of the customer computer station's identity by the ISP has the advantage of being less susceptible to fraudulent interference, since the ISP server is not connected to the customer computer station over the Internet, in contrast to the STS or the point of sale computer station which are connected to the customer computer station over the Internet and are thus more susceptible to fraudulent interference.

If the customer is certified and the customer agreed to pay for the goods as disclosed hereinbelow, the software module of the ISP server records the transaction details including the customer's user name, the current date and time, the price of the service or product and the terms of payment. The ISP server then connects to the STS and informs the STS whether the customer confirmed or denied the transaction and whether the customer is certified to pay through the STSP, and may also transfer the transaction details back to the STS for validation.

The STS then connects to the point of sale computer station using the information obtained from the STS's LUT as disclosed hereinabove, and informs the point of sale computer station whether or not to supply the customer with the requested service or product. The STS may also provide the point of sale computer station with the reason for denial of the service or product. On receipt of confirmation of the transaction from the STS, the point of sale computer station supplies the product or service to the customer. For example, if the ordered goods are a tangible product, the point of sale computer station processes the order and issues instructions for mailing the product to the customer. Alternatively, if the customer purchased non-tangible goods such as access to a database, the point of sale computer station enables the customer's computer station to access the database. In another example, if the customer purchased a software product, the point of sale computer station will download the software product over the Internet to the customer's computer station.

On receipt of a denial of the transaction, the point of sale computer station informs the customer computer station of the reason for which it can not fulfill the request.

Alternatively, in accordance with another preferred embodiment of the present invention, after the initial communication between the customer computer station and the available STS is established as described hereinabove, the STS obtains the address of the ISP server from the database or table as disclosed hereinabove, using the automatically revealed IP address of the customer computer station. The STS then sends to the ISP server, the IP address of the customer computer station and the transaction details. The STS also causes the customer computer station to connect to the ISP server using the address of the ISP obtained by the STS from the database or table disclosed hereinabove and sent to the customer computer station. For example, this can be done by using the HTML "Location:" command. The ISP server first checks whether the customer is certified to pay through the STSP. If the customer is not certified to pay through the STSP, the ISP informs the STS that the customer is not certified. If the customer is certified to pay through the STSP, the ISP sends a transaction verification form to the customer computer station. It is noted that, the information included in the transaction verification form is as disclosed hereinabove for the first preferred embodiment of the present invention. The customer then confirms or denies the transaction details and the other steps are performed as disclosed in detail hereinabove.

From time to time, the STSP provides the financial service such as the bank or the credit card company with periodic reports including the details of all the transactions performed over a period of time. For each transaction, the details include the credit card number or bank account number of the ISP from which the transaction was initiated, the credit card number or bank account number of the vendor involved in the transaction and the amount and date of payment or payments.

The financial service provider transfers the proper amounts from the ISPs to the relevant vendors. The financial service provider may also deduct a commission for itself and/or for the STSP and/or for the ISP.

The ISP bills the customer for the transactions performed by the customer according to the billing agreement already existing between the customer and the ISP.

It is noted that, the billing of the customer could alternatively be done by another party, such as a telephone company, in which case all the relevant billing details are transferred from the STSP to this party.

It is further noted that the term ISP is used throughout the present application to represent any organization providing Internet access to one or more computer station. The organization may or may not charge a fee for supplying Internet access. For example the term ISP may represent a company having a server through which the employees of the company access the Internet. Thus, the customer computer stations can be the computer stations used by the employees of the company. In such a case, the billing of the customers which are company employees for the goods purchased from the vendor may be done by deducting the proper amounts from the salary of the employees.

It is still further noted that, in accordance with another preferred embodiment of the present invention, if the STS detects a problem during the steps of the method disclosed hereinabove, the STS will send a message to the relevant server or computer station causing it to cancel the transaction. For example, if the point of sale computer station did not inform the STS that the goods were supplied, the STS instructs the ISP to delete the relevant billing record. In another example, if the STS detects communication failures such as erroneous data or an inability to contact the point of sale computer station, the STS instructs the ISP to delete the relevant billing record.

Figure 2:
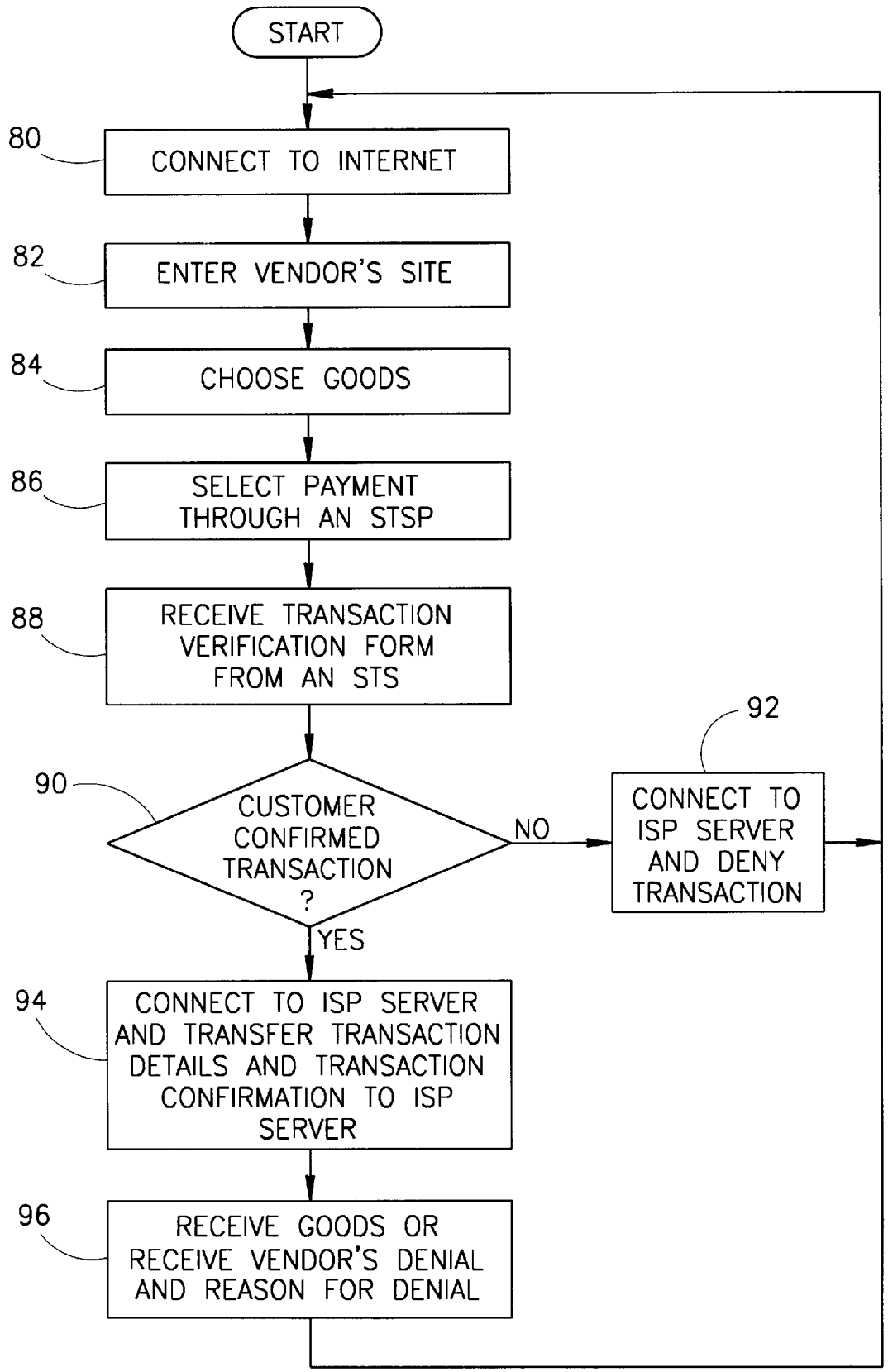
FIG. 2 is a schematic flow chart illustrating the steps of the retail method performed by a customer using the customer computer station of the system of FIG. 1.

Reference is now made to FIGS. 2–5. FIG. 2 is a schematic flow chart illustrating the steps of a method for Internet billing performed by a customer of the system of FIG. 1, in accordance with a preferred embodiment of the present invention. The customer connects to the Internet using the customer computer station (step 80). The customer enters a vendor's site on a point of sale computer station (step 82) and selects goods such as a service or a product which is offered for sale by the vendor (step 84). If the point of sale computer station allows payment for the selected goods through the STSP, the customer selects this payment method (step 86). The customer computer station then receives a transaction verification form from one of the STSs of the STSP 20 (step 88) as disclosed in detail hereinabove. The customer checks the transaction details displayed on the transaction verification form and can confirm or deny his willingness to accept the transaction conditions (step 90). For example, the customer can click on an "accept" or a "reject" button provided on the transaction verification form for confirming or denying the transaction, respectively.

If the customer did not confirm the transaction on the transaction verification form, the customer's computer station connects to the ISP server of the ISP which provides Internet access to the customer, denies the transaction (step 92), and transfers control to step 84. If the customer confirmed the transaction, the customer computer station connects to the ISP server of the ISP which provides Internet access to the customer and transfers the transaction details and the transaction confirmation to the ISP server (step 94). The customer can then receive the goods from the vendor or can alternatively receive a denial message from the vendor and the reason for the denial (step 96). For example, the customer can be given access to a data base or download a software product from the vendor's server. It is noted that if the transaction involved the sale of a tangible product, the product is sent by the vendor to the customer by mail or by any other suitable delivery method. Thus, in the case that the goods are a tangible product, there may be a substantial delay between step 94 and 96.

Figure 3:
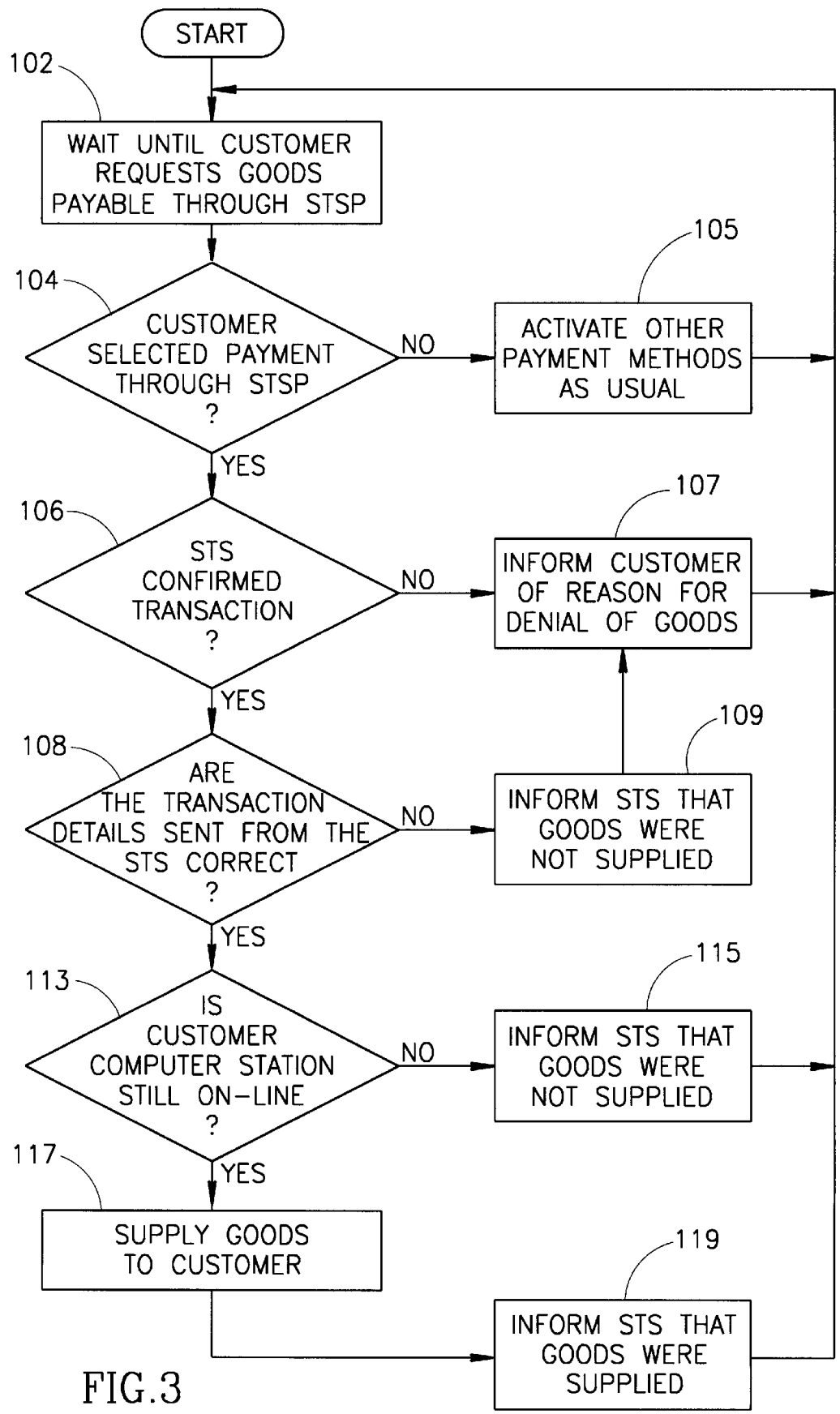
FIG. 3 is a schematic flow chart illustrating the steps of the retail method performed by a point of sale computer station of the system of FIG. 1.

FIG. 3 is a schematic flow chart illustrating the steps of a method for Internet billing performed by a point of sale computer station of the system of FIG. 1, in accordance with a preferred embodiment of the present invention. The point of sale computer station waits until a customer requests goods which are payable through the STSP method (step 102). The point of sale computer station checks if the customer selected payment through the STSP (step 104). If the customer did not select the STSP payment method, the customer can still activate other payment methods in the vendor's site according to the customer choice (step 105) and control is transferred to step 102. If the customer selected the STSP payment method, the point of sale computer station checks if the STS confirmed the transaction (step 106). If the STS did not confirm the transaction, the point of sale computer station informs the customer through the customer computer station of the reasons for denying the goods (step 107) and transfers control to step 102. If the STS confirmed the transaction, the point of sale computer station checks whether the transaction details sent by the STS are correct (step 108). If the transaction details as sent by the STS are not correct, the point of sale computer station informs the STS that the goods were not supplied (step 109), informs the customer of the reason of denial of goods (step 107) and transfers control to step 102. If the transaction details sent by the STS are correct, the point of sale computer station checks whether the customer computer station is still on-line (step 113). If the customer computer station is not on-line, the point of sale computer station informs the STS that the goods were not supplied (step 115)

and transfers control to step 102. If the customer computer station is still on-line, the point of sale computer station supplies the goods to the customer as disclosed hereinabove (step 117), informs the STS that the goods were supplied (step 119) and transfers control to step 102.

It is noted that if the transaction involved the sale of a tangible product, the product will be sent by the vendor to the customer by mail or by any other suitable delivery method.

Figure 4:
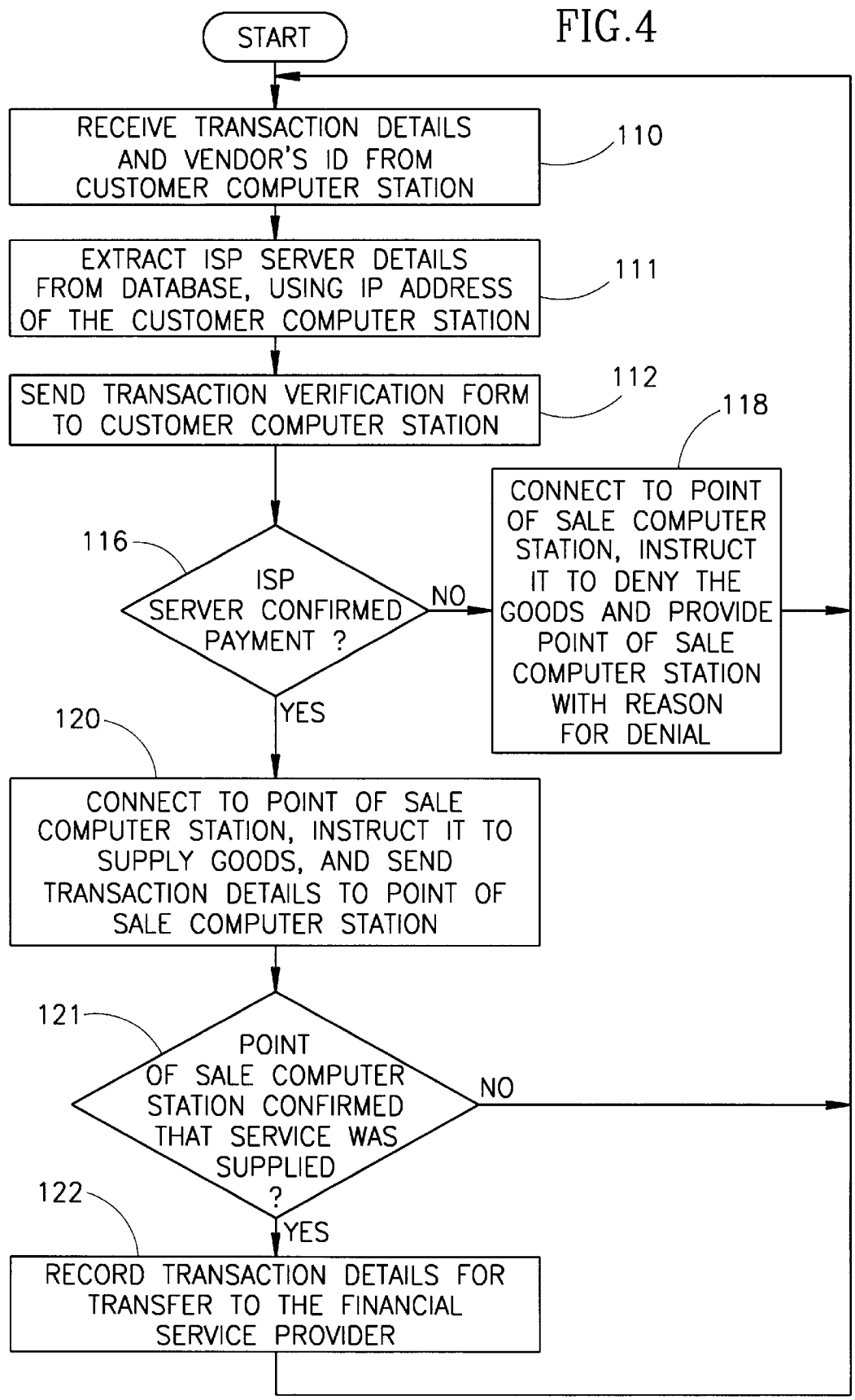
FIG. 4 is a schematic flow chart illustrating the steps of the retail method performed by a secure transaction server (STS) of the system of FIG. 1.

FIG. 4 is a schematic flow chart illustrating the steps of a method for Internet billing performed by a secure transaction server (STS) of the system of FIG. 1, in accordance with a preferred embodiment of the present invention. The STS receives the transaction details and the point of sale computer station ID from the customer computer station (step 110), extracts the ISP server details from the database or table as disclosed in detail hereinabove, using the IP address of the customer computer station which is received as part of the communication session details (step 111). The STS sends a transaction verification form to the customer computer station (step 112).

The STS then checks whether the ISP server of the ISP which provides service to the customer confirmed the payment (step 116). If the ISP server has not confirmed the payment, the STS connects to the point of sale computer station, instructs the point of sale computer station to deny goods from the customer and provides the point of sale computer station with the reason for the denial (step 118). The STS then transfers control to step 110. If the ISP server confirms payment, the STS connects to the point of sale computer station, instructs the point of sale computer station to supply the service or product to the customer and sends the transaction details to the point of sale computer station (step 120). The STS then checks whether the point of sale computer station confirmed that the goods were supplied (step 121). It is noted that, if the goods are tangible, the vendor's confirmation may include a confirmation that a mailing order for the purchased goods was processed.

If the point of sale computer station did not confirm that the goods were supplied, the STS transfers control to step 110. If the point of sale computer station confirmed that the goods were supplied, the STS records the transaction details for transfer to the financial service provider (step 122) and transfers control to step 110.

FIG. 5 is a schematic flow chart illustrating the steps of a method for Internet billing performed by an ISP server of the system of FIG. 1, in accordance with a preferred embodiment of the present invention. The ISP server receives the transaction details from the transaction verification form as filled by the customer (step 124) and connects to an available STS (step 126). The ISP server identifies the customer identity according to the communication session details (step 127). The customer identity may be an ID number or a user name which is used by the ISP for identifying the customer.

The ISP server checks whether the customer confirmed the payment on the customer's transaction verification form (step 128). If the customer did not confirm payment on the transaction verification form, the ISP server informs the STS that the customer refused payment (step 130) and transfers control to step 124. If the customer confirmed the payment on the transaction verification form, the ISP server checks whether the customer is certified to pay through the STSP (step 132). If the customer is not certified to pay through the STSP, the ISP server informs the STS that the customer is not certified (step 133) and transfers control to step 124. If the customer is certified, the ISP server informs the STS that the payment is authorized and transfers the transaction details to the STS for verification (step 134). The ISP server then records the transaction details for billing the customer (step 136) and transfers control to step 124.

It is noted that communication between the point of sale computer station and the STS and between the ISP server and the STS can be secured communication. The communication can be secured using a method of encryption such as the data encryption standard (DES) or any other suitable encryption method. A method of identification can also be used for increased security such as a public key cryptography method or any other suitable identification method. This ensures that the transaction verification procedures serve as an encrypted secured verification step and reduces the possibility of fraud.

It is further noted that the retail method of the present invention has the advantage that a vendor needs only establish one agreement with an STSP in order to be able to provide a secure payment method to all the customers of all the ISPs which are connected with the STSP. Another advantage of the STSP method is that an ISP needs to establish only one agreement with the STSP in order to provide a secure payment method between any one of its customers and any of the vendors that have agreements with the STSP, thus, the ISP does not need to establish separate agreements with many vendors.

Another advantage of the retail method of the present invention is that the customer can perform secured transactions with all the vendors which have agreements with the STSP, without having to install any software on his computer station.

Moreover, using the retail method of the present invention, the customer can perform transactions without having to transmit any sensitive information such as a credit card or account number or other personal details over the Internet.

It is noted that, in accordance with another preferred embodiment of the present invention, no billing is performed by the STS, the ISP or the financial service provider. Instead, the ISP sends to the STS the e-mail address of the customer and the STS periodically sends e-mail messages to the customer reminding the customer of his debt to the vendor from which the goods were received until the vendor informs the STS that the debt has been paid.

Alternatively, in accordance with another preferred embodiment of the present invention, the STS instructs the ISP to periodically send e-mail messages to the customer reminding the customer of his debt to the vendor from which the goods were received. When the vendor informs the STS that the debt has been paid, the STS instructs the ISP to stop sending the e-mail messages to the customer.

It is still further noted that, in accordance with another preferred embodiment of the present invention, the vendor may decide to supply the goods to the customer prior to validating the purchasing as disclosed hereinabove. In a non-limiting example, the vendor may provide the customer with access to a database and if the customer finds the information useful, the customer agrees to pay for the information, for example by activating a designated HTML link. The link connects the customer computer station to the STS, transfers the ID of the point of sale computer station and the transaction details to the STS as disclosed in step 110 of FIG. 4 and continues with the other steps of FIG. 4 as disclosed hereinabove.

In another non-limiting example, the customer downloads software from the point of sale computer station for checking the software prior to performing step 80 of FIG. 2. If the customer decides to pay for the software, the customer connects to the point of sale computer station and performs steps 80 to 94 (FIG. 2) as disclosed hereinabove. It is noted that, in the last example, step 96 is not performed since the software was already downloaded to the customer computer station.

While the invention has been described with respect to a limited number of embodiments, it will be appreciated that many variations, modifications and other applications of the invention may be made.

What is claimed is:

1. A retail method over a wide area network including a point of sale computer station, a network service provider server operated by a network service provider, a customer computer station used by a customer and connected to said wide area network through the network service provider server, and a transaction server having access to identification information of said network service provider and said point of sale computer station, the method comprising the steps of:

connecting said customer computer station to said point of sale computer station;

purchasing goods from said point of sale computer station by said customer;

validating said purchasing by said transaction server and said network service provider server;

charging said customer for said purchasing, said charging comprising a transaction including the steps of billing an account of said customer by said network service provider server a transaction sum and billing by said transaction server an account of said network service provider server said transaction sum;

supplying said goods to said customer; and remitting a portion of said transaction sum to a vendor operating said point of sale computer station.

2. The retail method according to claim 1 further including the step of remitting a portion of said transaction sum to a network service provider operating said network service provider server.

3. The retail method according to claim 1 further including the step of remitting a portion of said transaction sum to the transaction service provider operating said transaction server.

4. The retail method according to claim 1 wherein said step of validating comprises the steps of:

automatically receiving by said transaction server from said customer computer station of transaction details of said transaction and identification information for identifying said point of sale computer station and the network address of said customer computer station;

sending a transaction verification form from said transaction server to said customer computer station, said transaction verification form including at least said transaction details and information for contacting said network service provider server;

entering by said customer in said transaction verification form a confirmation or a denial of said transaction details;

sending by said customer computer station of said transaction details and said confirmation or said denial of said transaction details from said customer computer station to said network service provider server using said information for contacting said network service provider server included in said transaction verification form;

informing said transaction server by said network service provider server of said confirmation or said denial of said transaction details by said customer in said transaction verification form; and instructing said point of sale computer station by said transaction server to supply or deny said goods to said customer in accordance with said confirmation or said denial, respectively, of said transaction details by said customer.

5. The retail method according to claim I wherein said identification information of said network service provider and said point of sale computer station comprises:

information for associating a customer network address with a network service provider and technical information needed to contact said network service provider server; and information for associating said vendor with the technical information needed to contact said point of sale computer station over said wide area network.

6. The retail method according to claim 5 wherein said identification information is stored on said transaction server.

7. The retail method according to claim 1 wherein said wide area network is the Internet, said network service provider is an Internet service provider and wherein said information for associating a customer comprises at least the IP address space of said Internet service provider and technical information needed to contact said Internet service provider, and wherein said information for associating said vendor is technical information needed to contact said point of sale computer station over the Internet.

8. The retail method according to claim 1 wherein said step of charging further includes the step of recording by said network service provider server of said transaction details for billing said customer by said network service provider.

9. The retail method according to claim 1 wherein said step of remitting comprises the step of crediting an account of said vendor by said portion of said transaction sum.

10. The retail method according to claim 9 wherein said step of crediting is performed by a financial service provider.

11. The retail method according to claim 10 wherein said financial service provider is selected from the group consisting of a bank and a credit card company.

12. The retail method according to claim 9 wherein said account of said vendor is a bank account or a credit card account.

13. The retail method according to claim I wherein said step of validating comprises the steps of:

automatically receiving by said transaction server from said customer computer station of transaction details of said transaction and identification information for identifying said point of sale computer station and the network address of said customer computer station;

sending said transaction details and the network address of said customer computer station from said transaction server to said network service provider server;

said transaction server causing said customer computer station to contact said network service provider;

sending a transaction verification form from said network service provider server to said customer computer station, said transaction verification form including at least said transaction details;

entering by said customer in said transaction verification form a confirmation or a denial of said transaction details;

sending by said customer computer station of said transaction details and said confirmation or said denial of said transaction details from said customer computer station to said network service provider server;

informing said transaction server by said network service provider server of said confirmation or said denial of said transaction details by said customer in said transaction verification form; and instructing said point of sale computer station by said transaction server to supply or deny said goods to said customer in accordance with said confirmation or said denial, respectively, of said transaction details by said customer.

14. The retail method according to claim 1 wherein communication between said point of sale computer station and said transaction server and between said transaction server and said network service provider server is encrypted.

15. The retail method according to claim 1 wherein the transaction service provider operating said transaction server establishes a remitting agreement with said vendor for remitting a portion of the transaction sum to said vendor after said step of charging, wherein said remitting agreement is established prior to using said retail method and wherein said transaction service provider establishes a billing agreement with said network service provider for billing an account of network service provider said transaction sum for goods purchased by said customer from said point of sale computer station, wherein said billing agreement is established prior to using said retail method.

16. The retail method according to claim 15 wherein said network service provider establishes a billing agreement with said customer for billing an account of said customer said transaction sum for goods purchased by said customer from said point of sale computer station, wherein said billing agreement is established prior to using said retail method.

17. The retail method according to claim 4 wherein a per transaction billing agreement is established between said customer and said network service provider for billing an account of said customer said transaction sum for goods purchased by said customer from said point of sale computer station.

18. A system for using a retail method over a wide area network, the system comprising:

at least one network service provider server operated by a network service provider and connected to said wide area network;

at least one customer computer station used by a customer and connected to said wide area network through one of said at least one network service provider server;

at least one point of sale computer station connected to said wide area network; and at least one transaction server having access to identification information of said at least one network service provider and said at least one point of sale computer station and connected to said wide area network, wherein said retail method comprises the steps of:

connecting one of said at least one customer computer station to one of said at least one point of sale computer station;

purchasing goods from said one of said at least one point of sale computer station by said customer operating said one of said at least one customer computer station;

validating said purchasing by one of said at least one transaction server and one of said at least one network service provider server;

charging said customer for said purchasing, said charging comprising a transaction including the steps of billing an account of said customer by said one of said at least one network service provider server a transaction sum and billing by said one of said at least one transaction server an account of said one of said at least one network service provider server said transaction sum;

supplying said goods to said customer; and remitting a portion of said transaction sum to a vendor operating said one of said at least one point of sale computer station.

19. The system according to claim 18 wherein said step of validating comprises the steps of:

automatically receiving by said one of said at least one transaction server from said one of said at least one customer computer station of transaction details of said transaction and identification information for identifying said one of said at least one point of sale computer station and the network address of said one of said at least one customer computer station;

sending a transaction verification form from said one of said at least one transaction server to said one of said at least one customer computer station, said transaction verification form including at least said transaction details and information for contacting said one of said at least one network service provider server;

entering by said customer in said transaction verification form a confirmation or a denial of said transaction details;

sending by said customer computer station of said transaction details and said confirmation or said denial of said transaction details from said one of said at least one customer computer station to said one of said at least one network service provider server using said information for contacting said one of said at least one network service provider server included in said transaction verification form;

informing said one of said at least one transaction server by said one of said at least one network service provider server of said confirmation or said denial of said transaction details by said customer in said transaction verification form; and instructing said one of said at least one point of sale computer station by said one of said at least one transaction server to supply or deny said goods to said customer in accordance with said confirmation or said denial, respectively, of said transaction details by said customer.

20. The system according to claim 18 wherein said step of validating comprises the steps of:

automatically receiving by said one of said at least one transaction server from said one of said at least one customer computer station of transaction details of said transaction and identification information for identifying said one of said at least one point of sale computer station and the network address of said one of said at least one customer computer station;

sending said transaction details and the network address of said one of said at least one customer computer station from said one of said at least one transaction server to said one of said at least one network service provider server;

said one of said at least one transaction server causing said one of said at least one customer computer station to contact said one of said at least one network service provider;

sending a transaction verification form from said one of said at least one network service provider server to said one of said at least one customer computer station, said transaction verification form including at least said transaction details;

entering by said customer in said transaction verification form a confirmation or a denial of said transaction details;

sending by said one of said at least one customer computer station of said transaction details and said confirmation or said denial of said transaction details from said one of said at least one customer computer station to said one of said at least one network service provider server;

informing said one of said at least one transaction server by said one of said at least one network service provider server of said confirmation or said denial of said transaction details by said customer in said transaction verification form; and instructing said one of said at least one point of sale computer station by said one of said at least one transaction server to supply or deny said goods to said customer in accordance with said confirmation or said denial, respectively, of said transaction details by said customer.

21. The system according to claim 18 wherein said identification information of said one of said at least one network service provider and said one of said at least one point of sale computer station comprises:

information for associating a customer network address with a network service provider and with technical information needed to contact said one of said at least one network service provider server; and information for associating said vendor with the technical information needed to contact said one of said at least one point of sale computer station over said wide area network.

22. The system according to claim 21 wherein said identification information is stored on said at least one transaction server.

23. The system according to claim 21 wherein said wide area network is the Internet, said at least one network service provider is an Internet service provider and wherein said information for associating a customer comprises at least the IP address space of said one of said at least one Internet service provider and technical information needed to contact said one of said at least one Internet service provider, and wherein said information for associating said vendor is technical information needed to contact said one of said at least one point of sale computer station over the Internet.

24. The system according to claim 18 wherein communication between said one of said at least one point of sale computer station and said one of said at least one transaction server and between said one of said at least one transaction server and said one of said at least one network service provider server is encrypted.

* * * * *